No. 701,841. Patented June 10, 1902.
D. L. CHANDLER.
ROLL FOR PLAITING MACHINES.
(Application filed Sept. 11, 1901.)
(No Model.)
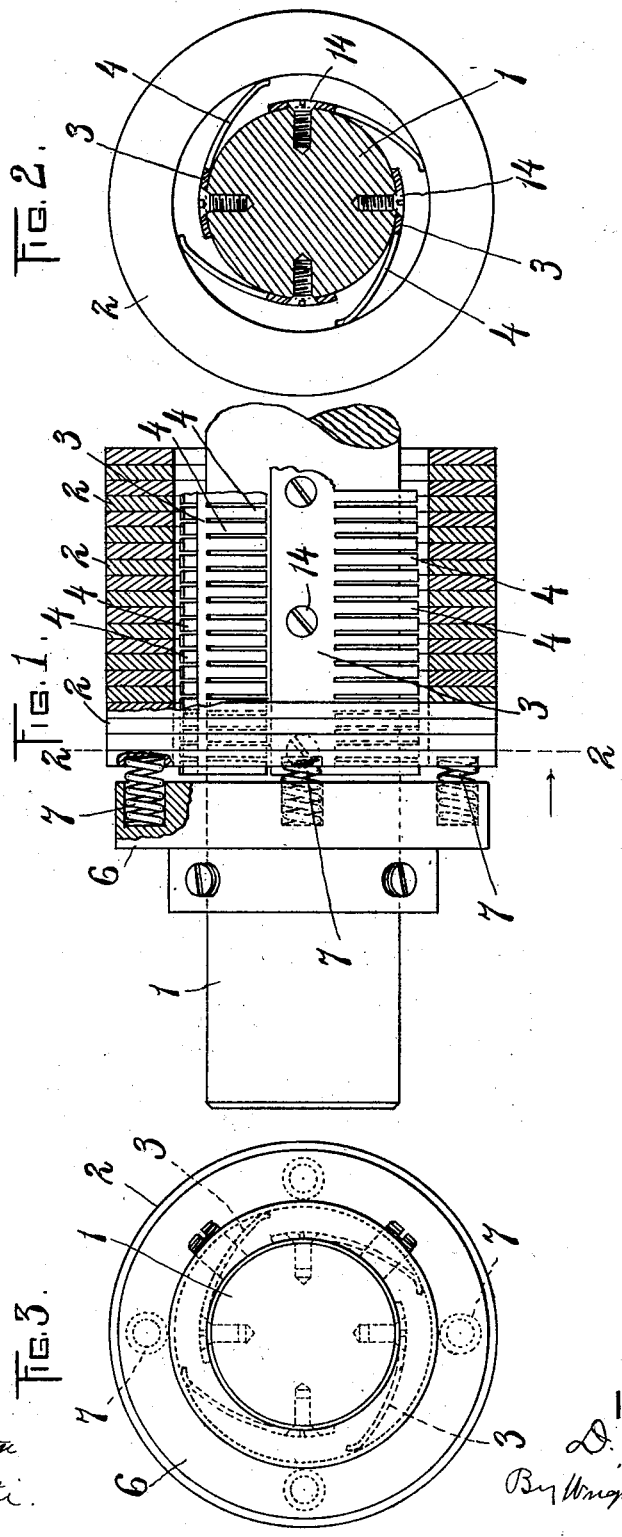
WITNESSES:
George Pezzetti
P. W. Pezzetti.
INVENTOR:
D. L. Chandler
By Wright Brown & Quinby
Attys.
THE NORRIS PETERS CO., PHOTO-LITHO., WASHINGTON, D. C.

UNITED STATES PATENT OFFICE.

DANIEL L. CHANDLER, OF AYER, MASSACHUSETTS, ASSIGNOR TO GEORGE J. BURNS, OF AYER, MASSACHUSETTS.

ROLL FOR PLAITING-MACHINES.

SPECIFICATION forming part of Letters Patent No. 701,841, dated June 10, 1902.

Application filed September 11, 1901. Serial No. 75,041. (No model.)

*To all whom it may concern:*

Be it known that I, DANIEL L. CHANDLER, of Ayer, in the county of Middlesex and State of Massachusetts, have invented certain new and useful Improvements in Yielding-Surfaced Rolls, of which the following is a specification.

This invention relates to rolls for use in plaiting-machines and in other situations where it is desirable to have an even pressure on the work, although the latter may be uneven in contour.

The invention consists in the novel construction hereinafter described and claimed.

Of the accompanying drawings, Figure 1 represents a longitudinal section, partly broken away, of a sectional roll constructed in accordance with my invention. Fig. 2 represents a transverse section on the line 2 2 of Fig. 1. Fig. 3 represents an end elevation.

The same reference characters indicate the same parts in all the figures.

In the drawings, 1 is a central supporting shaft or arbor, and 2 2 are a series of rings or sections making up the cylindrical periphery of the roll and displaceable radially of the shaft 1 independently of each other, so that portions of the periphery of the roll may yield more than other portions to accommodate inequalities in the work. Between the shaft and rings is interposed a series of tangential spring-plates 3 3, whose inner margins constitute hub or trunk portions and are attached by screws 14 14 to the surface of the shaft 1, their outer edges being formed into yielding spring-fingers or leaf-spring sections 4 4, which press outwardly against the rings 2 2 with a balanced pressure. By employing leaf-springs in preference to springs of other forms I am enabled to obtain ample spring-pressure in a contracted space, thereby retaining a large diameter of shaft, which is essential to prevent springing or bowing in a long roll.

6 6 are fixed rings or flanges on the ends of the roll, between which and the end rings of the series 2 2 are interposed short helical springs 7 7, which exert a balanced axial pressure serving to hold the rings 2 2 in contact. These rings 6 allow for longitudinal expansion of the roll periphery, which would otherwise cramp and interfere with the relative radial movement of the rings when the roll is subjected to heat.

I do not confine myself to the details of construction herein set forth.

I claim—

1. A roll comprising a peripheral portion composed of a plurality of independently-movable annular sections, a supporting-shaft, and independent spring devices interposed between said shaft and peripheral portion and each comprising a trunk portion and a plurality of spring-fingers integral therewith and bearing on a plurality of said sections, the said fingers extending substantially tangential to the shaft.

2. A roll comprising a peripheral portion composed of a plurality of independently-movable annular sections, a supporting-shaft, independent spring devices interposed between said shaft and peripheral portion and each comprising a plate extending longitudinally of the shaft and having a plurality of integral spring-fingers bearing upon a plurality of said sections and independent removable attaching devices detachably securing said plates to the shaft.

3. A roll comprising a peripheral portion composed of a plurality of independently-movable annular sections, and means yieldingly pressing said sections together in an axial direction and adapted to yield to permit their axial expansion.

In testimony whereof I have affixed my signature in presence of two witnesses.

DANIEL L. CHANDLER.

Witnesses:
W. G. R. SPENCER,
FANNIE G. WALCH.